(12) United States Patent
Kim

(10) Patent No.: US 6,856,363 B2
(45) Date of Patent: Feb. 15, 2005

(54) LIQUID CRYSTAL DISPLAY MODULE

(75) Inventor: Jung-Ki Kim, Kyongki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 179 days.

(21) Appl. No.: 09/736,280

(22) Filed: Dec. 15, 2000

(65) Prior Publication Data
US 2002/0021383 A1 Feb. 21, 2002

(30) Foreign Application Priority Data
Dec. 15, 1999 (KR) ........................................ 1999-57984

(51) Int. Cl.[7] ............................................ G02F 1/1335
(52) U.S. Cl. .............................. 349/65; 349/58; 362/31; 362/26; 361/60
(58) Field of Search ............................ 349/61, 58, 67, 349/65; 362/31, 26; 361/60

(56) References Cited

U.S. PATENT DOCUMENTS

| | | | | |
|---|---|---|---|---|
| 5,528,720 A | * | 6/1996 | Winston et al. ............. | 385/146 |
| 5,666,172 A | * | 9/1997 | Ida et al. ....................... | 349/58 |
| 5,673,128 A | * | 9/1997 | Ohta et al. .................... | 349/62 |
| 5,886,759 A | * | 3/1999 | Mashino et al. .............. | 349/65 |
| 6,295,105 B1 | * | 9/2001 | Lee et al. ...................... | 349/65 |

* cited by examiner

Primary Examiner—Tarifur R. Chowdhury
Assistant Examiner—P. R. Akkapeddi
(74) Attorney, Agent, or Firm—McGuireWoods LLP

(57) ABSTRACT

An LCD module having a lamp cover with an improved structure, includes a lamp; a lamp cover which is bent once so as to define an upper plate and a side plate thereof, and which covers an upper portion and side portion of the lamp with a lower portion of the lamp being opened, the lamp cover being arranged to reflect a light produced from the lamp; a light guide plate having an upper surface and a side surface thereof corresponding to the upper and side plates of the lamp cover, respectively, the light guide plate being arranged to a side of the lamp cover, the light guide plate receiving a light produced from the lamp through the side surface thereof and transmitting the light toward the upper surface thereof; and a rear reflector plate arranged at a lower surface of the light guide plate and which is extended toward the lower portion of the lamp, the rear reflector plate directing toward the upper surface of the light guide plate a light being leaked through the lower surface of the light guide plate.

16 Claims, 3 Drawing Sheets

LIQUID CRYSTAL DISPLAY MODULE

BACKGROUND OF THE INVENTION

1. Field of the Invention

The present invention relates generally to a liquid crystal display(LCD) module, and more particularly, to an LCD module in which a lamp cover and a rear reflector plate have improved structure and coupling arrangement, thereby preventing "wrinkling appearance" caused at a rear reflector plate and "light leakage" caused between a lamp cover and a rear reflector panel.

2. Description of the Related Art

LCDs are commonly used as an information display device. From among LCD components, a backlight unit plays a significant role since its structure affects on the size and light efficiency of LCD, and further on the overall mechanical and optical characteristic of LCD.

Backlighting structure for an LCD display is disclosed in detail in U.S. Pat. No. 5,567,042 "Reflector for flat panel display backlight unit", U.S. Pat. No. 5,592,193 "Backlighting arrangement for LCD display panel", U.S. Pat. No. 5,608,553 "Back light for liquid crystal display", and U.S. Pat. No. 5,640,483 "Backlighting system utilizing total internal reflection".

In such a conventional backlighting structure, a series of sheets are interposed between a front surface of a light guide plate and a liquid crystal display panel, and a rear reflector plate is interposed between a rear surface of the light guide plate and a mold frame. In this case, the stacked sheets contribute to improvements in viewing angle and luminance of light emitted from the front surface of the light guide plate, while the rear reflector plate serves to direct the light leaked through the rear surface of the light guide plate toward the front surface of the light guide plate.

A lamp to be used as a light source is disposed in a portion of the light guide plate, being covered by a lamp cover.

Here, the lamp cover is bent into a square C shape, for instance, and fitted to a side portion of the light guide plate in such a manner that an end of the lamp cover directed toward the light exit area is elongated significantly toward a light entrance area of the light guide plate. Then, upper and lower plates of the lamp cover directed toward the light exit area are overlapped to the upper and lower surfaces of the light guide plate directed toward the light entrance area of the light guide plate.

In this case, if the lamp cover having an end thereof directed toward the light exit area and which is elongated, is fitted to a side portion of the light guide plate, the lower plate of the lamp cover directed toward the light exit area strongly presses the rear reflector plate, since the rear reflector plate is arranged at the rear surface of the light guide plate. Such a structural characteristic of the backlight unit affects adversely to an overall display quality of the device.

For example, if the lower plate of the lamp cover directed toward the light exit area presses too strongly the rear reflector plate, a deformation may be caused onto the rear reflector plate due to a pressing force transmitted from the lamp cover, thus resulting in a so-called "wrinkling appearance".

For another example, if the lower plate of the lamp cover directed toward the light exit area presses with a lower intensity the rear reflector plate, a gap is produced between the rear reflector plate and the lamp cover, resulting in a "light leakage" where a light emitted from the lamp is leaked at the lower plate of the lamp cover directed toward the light exit area.

In a conventional manufacturing procedure, a gap of the lamp cover is controlled during an assembly work for a backlight unit, to thereby control the degree of pressing exerted onto the rear reflector plate by the lamp cover, so that in-advance prevention against the above-mentioned wrinkling appearance and light leakage can be obtained.

However, the wrinkling appearance and the light leakage have a close relation with each other. That is, if the degree of pressing exerted onto the rear reflector plate by the lamp cover is raised in order to prevent a light leakage, a wrinkling appearance may be caused at the rear reflector plate by the increased pressure applied thereto. On the contrary, if the degree of pressing exerted onto the rear reflector plate by the lamp cover is lowered so as to prevent a wrinkling appearance, a light leakage may be caused by the reduced pressure applied to the rear reflector plate. In summary, conventional approaches have failed in obtaining a simultaneous prevention against wrinkling appearance and light leakage.

SUMMARY OF THE INVENTION

Therefore, it is an object of the present invention to accomplish a simultaneous prevention against wrinkling appearance and light leakage by improving significantly structures of a backlight unit, specifically a lamp cover and a rear reflector plate.

It is another object of the present invention to improve an overall optical characteristic of system by a simultaneous prevention against wrinkling appearance and light leakage.

To accomplish the above objects of the present invention, there is provided an LCD module having a lamp cover which is bent once so that the lamp cover only has upper and side plates. In this case, the lamp cover is transformed from a conventional square C shape into an inverse L shape in which a bottom surface of the lamp is opened.

With such an improvement in the structure of lamp cover, a rear reflector plate of the present invention is extended toward a bottom surface of the lamp. In this case, the rear reflector plate covers the bottom surface of the lamp, to thereby allow the light emitted from the lamp to be reflected toward a light guide plate.

In the present invention, since a lamp cover has a structure where a lower plate thereof is eliminated, a rear reflector plate can be prevented from being suppressed by a lower plate of the lamp cover, resulting in an in-advance prevention against a wrinkling appearance which may otherwise be caused at the rear reflector plate.

In addition, since the rear reflector plate is extended to the bottom surface of the lamp without being coupled to the lamp cover, a gap between the rear reflector plate and the lamp cover is prevented, resulting in an in-advance prevention against a light leakage.

To summarize, with the present invention, a simultaneous prevention against wrinkling appearance and light leakage can be obtained, to thereby improve an overall optical characteristic of system.

Additional features and advantages of the present invention will be made apparent from the following detailed description of a preferred embodiment, which proceeds with reference to the accompanying drawings.

DETAILED DESCRIPTION OF THE PREFERRED EMBODIMENTS

Now, preferred embodiments of the present invention will be explained in more detail with reference to the attached drawings.

Figure 1:
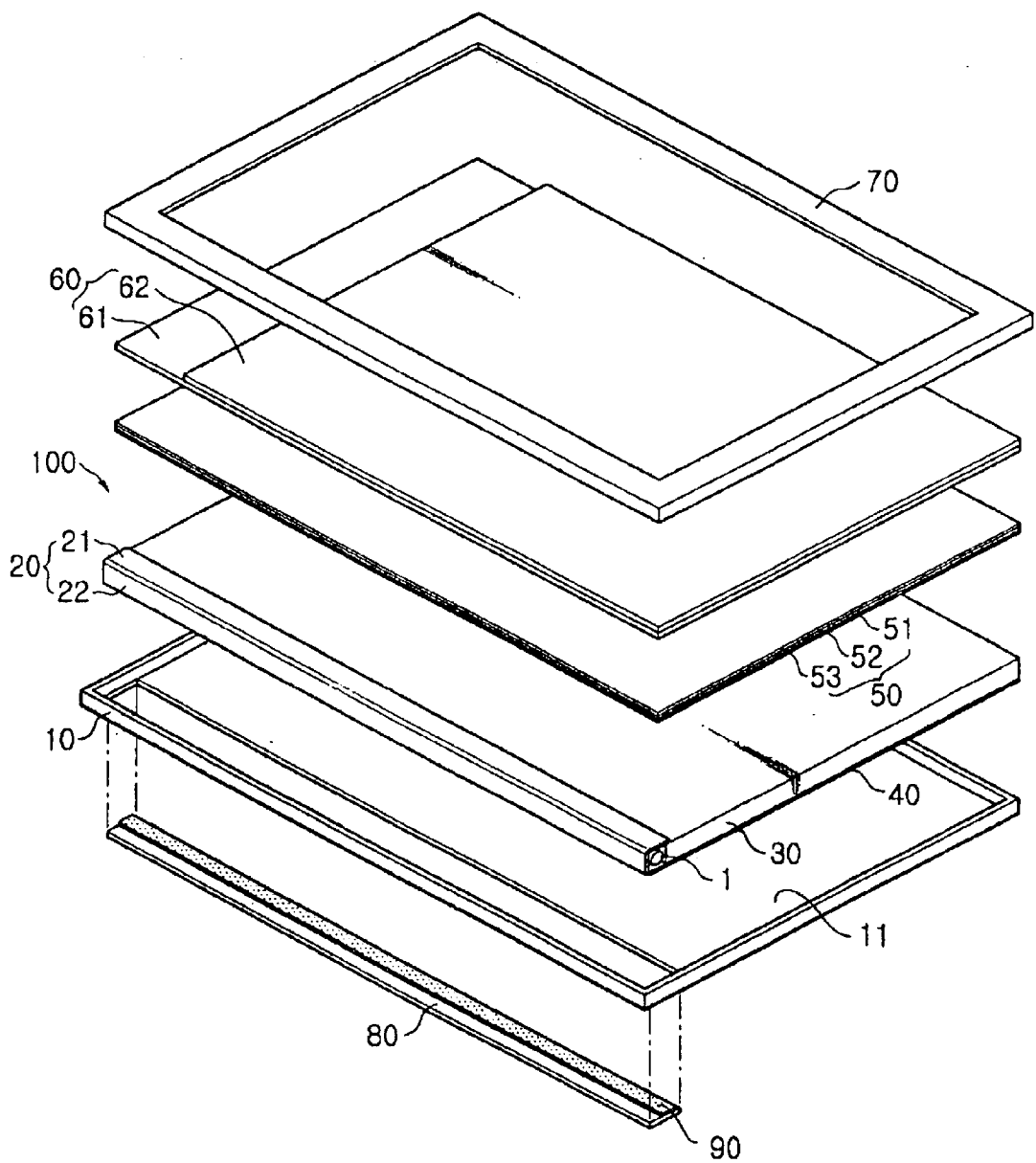
FIG. 1 illustrates a liquid crystal display module according to an embodiment of the present invention.

Referring to FIG. 1, an LCD module of the present invention has a mold frame 10 which is shaped as a square provided with an area to accommodate a backlight unit 100 constituted by a lamp 1, a lamp cover 20 and a light guide plate 30.

The lamp 1 is covered by the lamp cover 20, and the light guide plate 30 is disposed at the side portion of the lamp cover. The light guide plate 30 has at a bottom surface thereof a plurality of print dots(not shown) for dispersing the light incident from the lamp 1.

Disposed at a lower surface of the light guide plate 30 is a rear reflector plate 40 for reflecting, toward the upper surface of the light guide plate 30, the light which is emitted from the lamp 1 and leaked through the lower surface of the light guide plate 30.

A series of sheets 50 are stacked onto the opposite surface of the rear reflector plate 40, i.e., at the upper surface of the light guide plate 30, for improvements in viewing angle and luminance of the light produced in final.

The sheets 50 is constituted by an assembly including a diffusion plate 51, a prism sheet 52 arranged at the front surface of the diffusion plate 51, and a protection film 53 arranged at the front surface of the prism sheet 52.

The diffusion plate 51 functions to adjust a uniformity of light produced from the lamp 1, the prism sheet 52 functions to improve luminance of light produced from the lamp 1, and the protection film 53 functions to prevent damage to the prism sheet.

A liquid crystal display panel 60 is arranged at the front surface of the sheets assembly so as to display an image data inputted from an external source. The liquid crystal display panel 60 is constituted by a lower panel 61, and an upper panel 62 disposed onto the lower panel 61 with a liquid crystal interposed therebetween. The lower panel 61 has, for instance, a plurality of thin film transistors(not shown) forming a matrix, while the upper panel 62 has a color pattern(not shown) having colors of red(R), green(G) and blue(B).

A top chassis 70 is coupled to cover an edge of the mold frame 10. Here, the top chassis 70 is shaped as a square having at a front surface thereof a window having a size corresponding to an effective display area of the liquid crystal display panel 60. The top chassis 70 has edges having a depth sufficient to cover the mold frame 10.

A back cover 80 coupled at the bottom surface of the mold frame 10 so as to support the lamp 1 with stability.

Figure 2:
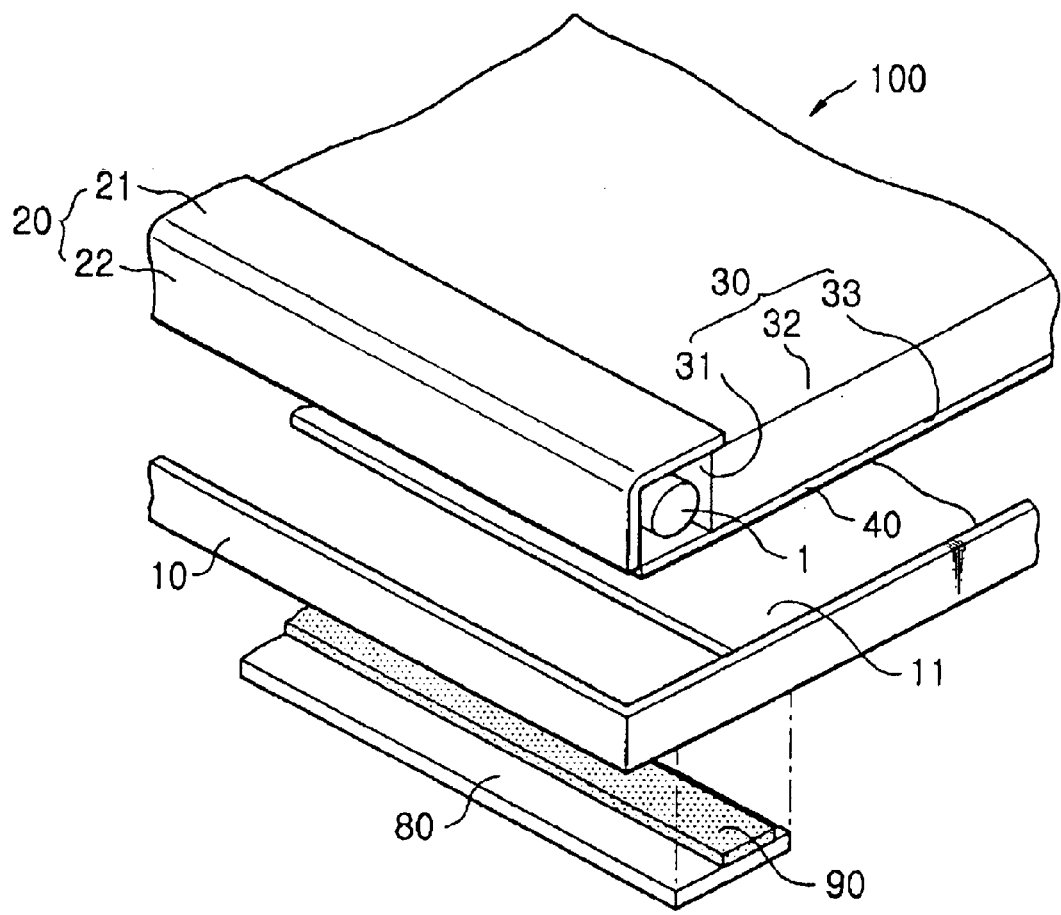
FIG. 2 is an enlarged partial view of the LCD module shown in FIG. 1.
Figure 3:
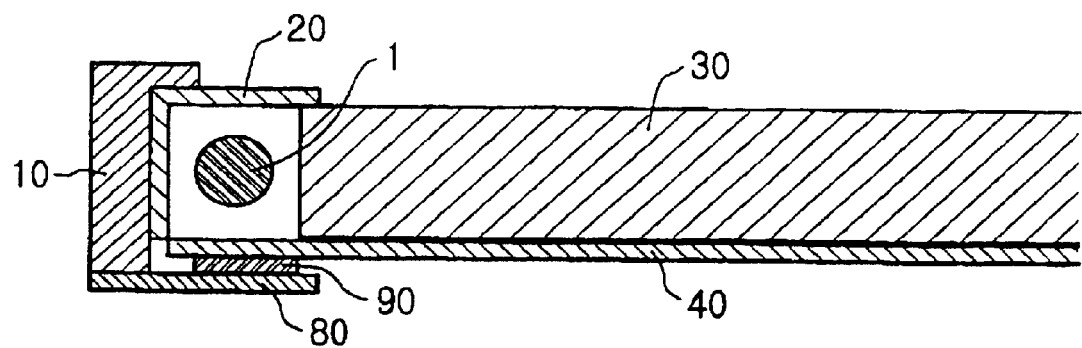
FIG. 3 is a sectional view illustrating the coupled state of the portion of LCD module shown in FIG. 2.

Referring to FIGS. 2 and 3, the lamp cover 20 having no lower plate is bent up and thus has only an upper plate 21 and a side plate 22. Therefore, the lamp cover 20 can be prevented from contacting the lower surface of the light guide plate 30.

Here, the upper plate 21 and the side plate 22 of the lamp cover 20 correspond to an upper s ace 32 and a side surface 31 of the light guide plate 30, respectively, and are shaped as an inverse L, allowing the lower surface of the lamp 1 to be opened.

As shown in FIGS. 2 and 3, the rear reflector plate 40 arranged at a lower surface 33 of the light guide plate 30 is extended toward the lower surface of the lamp 1 so as to cover the lower surface of the lamp which is opened. Thereby, the rear reflector plate performs a light reflecting function which, originally, has to be performed by the lower plate of the lamp cover.

Such a novel and new construction of the lamp cover 20 and the rear reflector plate 40 represents characteristics of the present invention.

In a conventional art, a lower plate of a lamp cover directed toward a light exit area is elongated and presses intensively a rear reflector plate, which may cause a wrinkling appearance at the rear reflector plate.

If, during manufacturing procedure, the lamp cover is controlled to press the rear reflector plate with less intensity so as to prevent the wrinkling appearance, a gap having a predetermined size is formed between the lamp cover and the rear reflector plate, thereby causing a light leakage. That is to say, conventional arts failed to prevent simultaneously wrinkling appearance and light leakage.

The present invention is advantageous in that a lower plate of a lamp cover is eliminated in advance so as to protect a rear reflector plate from being pressed by a lower plate of the lamp cover, to thereby obtain an in-advance prevention against a wrinkling appearance during the manufacturing procedure.

In addition, as described above, the rear reflector plate is extended toward the lower surface of the lamp without having any additional coupling to the lamp cover and performs by its own a light reflecting function which may otherwise be performed by the lamp cover. Therefore, with the present invention, a gap is prevented from being formed between the rear reflector plate and the lamp cover, to thereby obtain an in-advance prevention against a light leakage.

To summarize, with the present invention, a simultaneous prevention against a wrinkling appearance and light leakage can be obtained, resulting in improvements of overall optical characteristic.

Further, in the present invention, since the rear reflector plate is extended to the lower surface of the lamp, a sufficient amount of light being emitted through a light entrance area of the light guide plate can be ensured. As a result, reflective dots arranged at the light entrance area of the light guide plate can be eliminated during manufacturing procedure.

In addition, since the lower plate of the lamp cover is eliminated, cost for manufacturing the lamp cover can be significantly reduced, leading to an overall cost reduction of the system.

As shown in FIGS. 2 and 3, the rear reflector plate 40 contacts an end of the side plate 22 of the lamp cover 20.

The mold frame 10 accommodates the assembly of the lamp 1, lamp cover 20, light guide plate 30, rear reflector plate 40 and the liquid crystal display panel 60, and allows its bottom surface 11 to be opened, thereby exposing the rear reflector plate 40 to the outside.

The back cover 80 is coupled at the bottom surface of mold frame 10, and is disposed beneath the lamp 1 with the rear reflector plate 40 interposed therebetween. Here, arranged onto the back cover 80 is a light guide plate support member 90 for supporting the light guide plate 30 disposed onto the rear reflector plate 40, in such a manner that the support member 90 presses the rear reflector plate 40 which is exposed through the opened bottom surface 11 of the mold frame 10.

The light guide plate support member 90, along with the lamp cover 20 and the rear reflector plate 40, is a characteristic of the present invention. None of the conventional LCD module is provided with such a novel support member.

In a conventional art, the lower plate of the lamp cover directed toward the light exit area is elongated so as to intensively press the rear reflector plate, to thereby naturally support the light guide plate arranged onto the rear reflector plate. As a result, there exists no need to arrange an additional structure onto the lower surface of the rear reflector plate for supporting the light guide plate. However, the conventional art still suffers wrinkling appearance and light leakage phenomenon.

However, in the present invention, since the lamp cover 20 is configured in that the lower plate thereof is eliminated, an additional structure for supporting the light guide plate 30 with stability has to be arranged at a lower surface of the rear reflector plate 40.

For this purpose, the present invention employs the light guide plate support member 90 arranged at a surface of the back cover 80 for pressing the rear reflector plate 40 exposed through the bottom surface 11 of the mold frame 10. Thus, the light guide plate 30 can be supported by the support member 90 with stability even in the case where the support force from the lower plate of the lamp cover is absent.

The light guide plate support member 90 is formed of a non-rigid material, for example, Si rubber. If such is the case, the light guide plate support member 90 is capable of pressing with resilience the rear reflector plate 40 exposed through the open bottom surface 11 of the mold frame 10. Therefore, the support member 90 further stably supports the light guide plate 30 without causing a wrinkling appearance on the rear reflector plate 40.

In thus-configured LCD module, upon the occurrence of a direct incidence of light emitted from the lamp 1 and passed through the side surface 31 of the light guide plate 30 into the light guide plate 30, or upon occurrence of an incidence of light reflected at the upper plate 21 and the side plate 22 of the lamp cover 20, the light guide plate 30 transmits the incident light to the sheets 50, specifically the diffusion plate 51, disposed at the front surface of the light guide plate 30.

As mentioned above, the lamp cover 20 has a configuration in that a lower plate thereof is eliminated, and the rear reflector plate 40, without being coupled to the lamp cover 20, is extended to the lower surface of the lamp 1 and performs a light reflecting function replacing the lamp cover 20. Therefore, the light emitted from the lamp 1 is prevented from causing a light leakage.

The diffusion plate 51 transmits the light from the light guide plate 30 to the prism sheet 52 arranged at the front surface of the diffusion plate 51. Subsequently, the prism sheet 52 transmits the light from the diffusion plate 51 to the protection film 53 arranged at the front surface of the prism sheet.

Again, the protection film 53 transmits the light from the prism sheet 52 to the liquid crystal display panel 60 arranged at the front surface of the protection film 53, to thereby allow a final image information desired by a user to be rapidly displayed onto the liquid crystal display panel 60.

Figure 4:
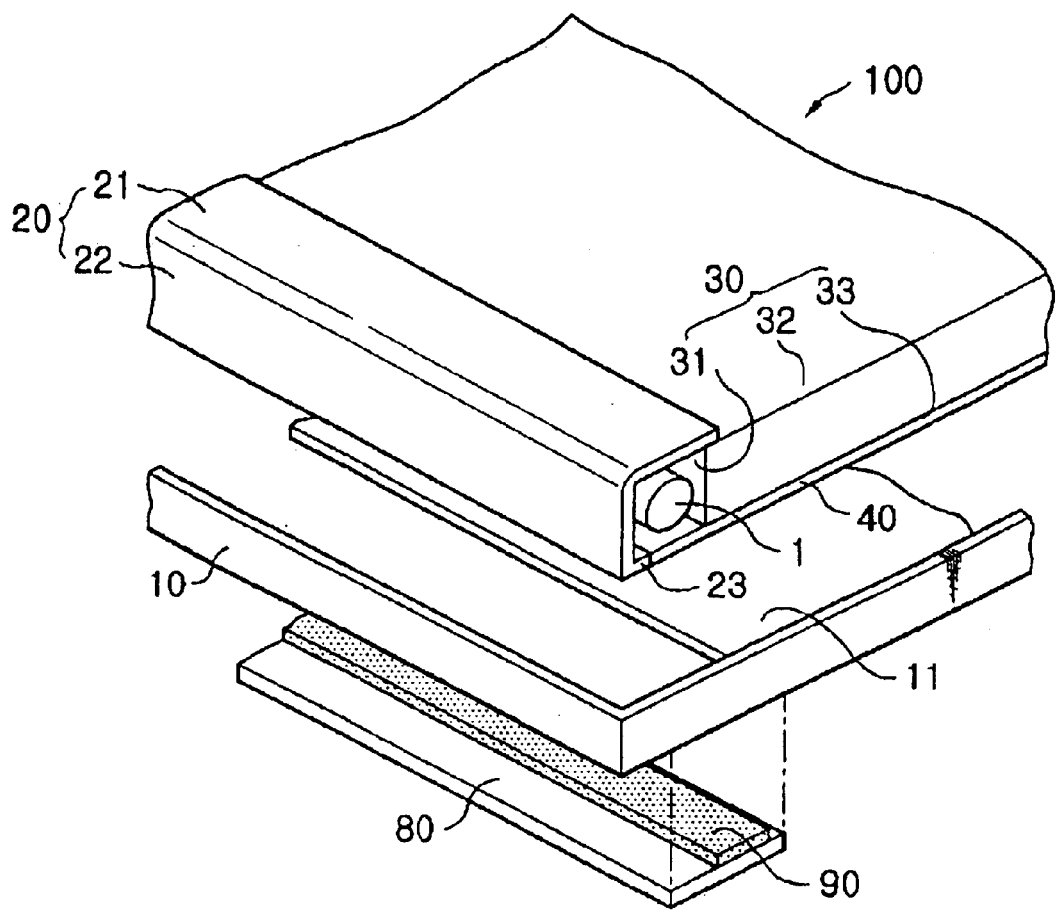
FIG. 4 illustrates an LCD module according to another embodiment of the present invention.
Figure 5:
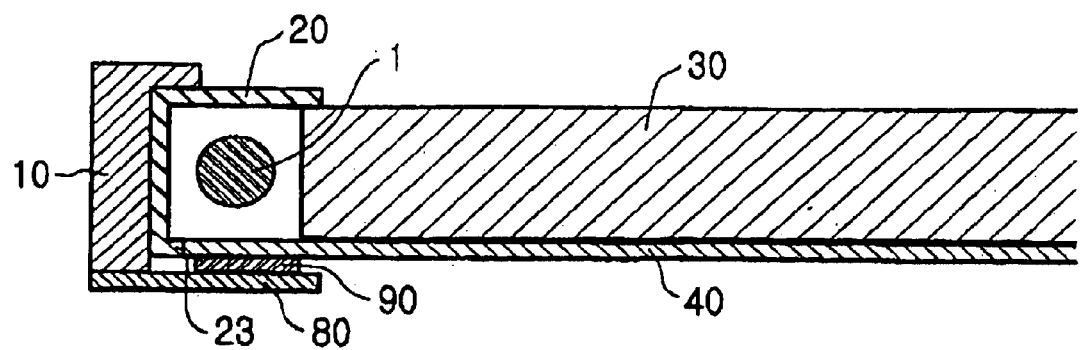
FIG. 5 is a sectional view illustrating the LCD module shown in FIG. 4.

Referring to FIGS. 4 and 5, an LCD module according to another embodiment of the present invention has the lamp cover 20 which differs from that of the first embodiment in that the lamp cover 20 of the second embodiment is bent twice, thus having the upper plate 21, side plate 22, and a lower plate 23.

The LCD module of the second embodiment of the present invention differs from a conventional LCD module in that the lower plate 23 has minimized size so as to be prevented from contacting the lower surface 33 of the light guide plate 33. In this case, the lamp cover 20 is near inverse L-shaped, allowing the bottom surface of the lamp to be opened.

In another embodiment of the present invention, the rear reflector plate 40 arranged at the lower surface 33 of the light guide plate 30 is also extended to the lower surface of the lamp 1 so as to cover the lower surface of the lamp 1. Here, the rear reflector plate 40 also performs a light reflecting function which may otherwise be performed by the lower plate 23 of the lamp cover 20.

Since the lower plate 23 partially constitutes the lamp cover 20, an LCD module of another embodiment of the present invention achieves an improved stability of the lamp cover 20 as compared with that of the first embodiment of the present invention.

In another embodiment of the present invention, the lower plate 23 of the lamp cover 20 has minimized size so as to prevent from pressing the lower surface 33 of the light guide plate 30. Therefore, with another embodiment of the present invention, the rear reflector plate 40 is prevented from being pressed by the lower plate 23 of the lamp cover 23, resulting in an in-advance prevention against a wrinkling appearance which may otherwise be caused at the rear reflector plate 40.

The rear reflector plate 40 of another embodiment of the present invention is extended toward the lower surface of the lamp 1 without being coupled to the lamp cover 20, and performs by its own a light reflecting function which may otherwise be performed by the lower plate 23 of the lamp cover 20. Therefore, with the another embodiment of the present invention, similarly to the first embodiment, a gap is prevented from being formed between the rear reflector plate 40 and the lamp cover 20, thus obtaining an in-advance prevention against light leakage.

In another embodiment of the present invention, the lower plate 23 of the lamp cover 20 is maintained minimized size, cost for manufacturing the lamp cover 20 can be significantly reduced during manufacturing thereof, leading to an overall cost reduction of system.

As described above, the present invention is advantageous in that a coupling arrangement between the lamp cover and the rear reflector plate is enhanced by the improvements in the shape of the lamp cover and rear reflector plate, to thereby achieve a simultaneous prevention against wrinkling appearance and light leakage which may otherwise be caused at the rear reflector plate and between the lamp cover and the rear reflector plate, respectively.

The present invention exerts favorable effectiveness throughout all types of LCDs.

In an LCD module according to an embodiment of the present invention, a lamp cover is bent once and has only upper and lower plates, eliminating the lower plate thereof. That is, the lamp cover is transformed from a conventional square C shape into an inverse L shape, allowing the lower surface of the lamp to be opened.

With such an improvement in the structure of lamp cover, the rear reflector plate is extended toward the lower surface of the lamp. The rear reflector plate covers the lower surface of the lamp, so that the light produced from the lamp is directed toward the light guide plate.

In the present invention, since the lamp cover is configured in that a lower panel thereof is eliminated, the rear reflector plate is protected from being pressed by a lower surface of the lamp cover, resulting in an in-advance prevention against a wrinkle appearance which may otherwise be caused at the rear reflector plate.

In addition, the rear reflector plate without being coupled to the lamp cover is extended toward the lower surface of the lamp. Therefore, a gap is prevented from being formed between the rear reflector plate and the lamp cover, resulting in an in-advance prevention against a light leakage.

The many features and advantages of the present invention are apparent in the detailed specification, and thus, it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope and spirit of the invention.

What is claimed is:

1. A liquid crystal display module comprising:

a lamp having an upper portion, a side portion and a lower portion;

a lamp cover covering the upper portion and the side portion of the lamp and exposing the lower portion;

a light guide plate having upper surface, a lower surface and a side surface adjoining the lamp; and a rear reflector plate arranged below the lower surface of the light guide plate and extended to cover the lower portion of the lamp.

2. A liquid crystal display module comprising:

a lamp having an upper portion, a side portion and a lower portion;

a lamp cover comprises:

an upper panel covering the upper portion of the lamp;

a side panel covering the side portion of the lamp; and a lower panel spaced apart from the lower portion of the lamp to expose the lower portion of the lamp;

a light guide plate having upper surface, a side surface adjoining the lamp and a lower surface; and a rear reflector plate arranged below the lower surface of the light guide plate and extended to cover the lower portion of the lamp.

3. A liquid crystal display module comprising:

a lamp having an upper portion, a side portion and a lower portion;

a lamp cover covering the upper portion and the side portion of the lamp;

a light guide plate having upper surface, a lower surface and a side surface adjoining the lamp;

a liquid crystal display panel arranged over the upper surface of the light guide plate;

a rear reflector plate arranged below the lower surface of the light guide plate and having a portion extended to cover the lower portion of the lamp;

a mold frame for accommodating the lamp, the lamp cover, the light guide plate, the rear reflector plate and the liquid crystal display panel and exposing the lower portion of the lamp;

a back cover attached to the mold frame to support the extended portion of the rear reflector plate; and a top chassis coupled to the mold frame.

4. The liquid crystal display module of claim 3, wherein the back cover comprises a support member pressing the extended portion of the rear reflector plate.

5. The liquid crystal display module of claim 4, wherein the support member is formed of a non-rigid material.

6. A display device comprising:

a lamp having an upper portion, a lower portion, a first side portion and a second side portion opposite to the first side portion;

a light guiding plate adjoining the first side portion of the lamp and having a top surface and a bottom surface;

a lamp cover covering the upper portion and the second side portion of the lamp;

a reflector plate formed below the bottom surface of the light guiding plate and having a portion extended to cover the low portion of the lamp; and a supporting member pressing the extended portion of the reflector plate toward the lamp unit.

7. The display device of claim 6, further comprising a mold frame accommodating the reflector plate, the light guiding plate, the lamp and the lamp cover.

8. The display device of claim 7, wherein the mold frame has an opening to expose the extended portion of the reflector plate.

9. The display device of claim 8, further comprising a back cover for covering the opening of the mold frame, wherein the supporting member is formed on the back cover.

10. The display device of claim 6, wherein the lamp cover comprises a top plate covering the upper portion of the lamp and a side plate covering the second side of the lamp.

11. The display device of claim 10, wherein the lamp cover further comprises a bottom plate extended from the side plate and spaced apart from the lamp to expose the lower portion of the lamp.

12. The display device of claim 11, wherein the bottom plate of the lamp cover contacts the extended portion of reflector plate.

13. The display device of claim 12, wherein the supporting member is spaced apart from the bottom plate of the lamp cover.

14. The display device of claim 6, further comprising a display panel formed on the top surface of the light guiding plate.

15. The display device of claim 14, wherein the display panel is a liquid crystal display panel.

16. The display device of claim 14, further comprises a chassis coupled to the mold frame to fix the liquid crystal display panel, the lamp, the lamp cover and the light guiding plate and the reflector plate therebetween.

* * * * *